(12) United States Patent
Kaufmann

(10) Patent No.: US 12,069,162 B2
(45) Date of Patent: Aug. 20, 2024

(54) FAST BILATERAL KEY CONFIRMATION

(71) Applicant: ASSA ABLOY AB, Stockholm (SE)

(72) Inventor: Martin Kaufmann, Graz (AT)

(73) Assignee: ASSA ABLOY AB, Stockholm (SE)

( * ) Notice: Subject to any disclaimer, the term of this patent is extended or adjusted under 35 U.S.C. 154(b) by 154 days.

(21) Appl. No.: 17/447,310

(22) Filed: Sep. 10, 2021

(65) Prior Publication Data

US 2023/0078954 A1 Mar. 16, 2023

(51) Int. Cl.
*H04L 9/08* (2006.01)
*H04L 9/06* (2006.01)
*H04L 9/14* (2006.01)
*H04L 9/32* (2006.01)

(52) U.S. Cl.
CPC .......... *H04L 9/0825* (2013.01); *H04L 9/0618* (2013.01); *H04L 9/14* (2013.01); *H04L 9/3263* (2013.01)

(58) Field of Classification Search
CPC ....... H04L 9/0825; H04L 9/0618; H04L 9/14; H04L 9/3263
See application file for complete search history.

(56) References Cited

U.S. PATENT DOCUMENTS

| | | | | |
|---|---|---|---|---|
| 9,806,888 | B1 * | 10/2017 | Gersten | H04L 9/3213 |
| 11,153,080 | B1 * | 10/2021 | Nix | H04L 9/3093 |
| 2015/0046710 | A1 * | 2/2015 | Clish | H04L 9/30 713/169 |
| 2019/0068591 | A1 * | 2/2019 | Zhang | H04L 63/0869 |
| 2020/0287720 | A1 * | 9/2020 | Le Scouarnec | H04L 63/061 |
| 2021/0099292 | A1 * | 4/2021 | Gilton | H04L 9/0825 |
| 2021/0184869 | A1 * | 6/2021 | Trere | H04L 9/3263 |
| 2021/0328779 | A1 * | 10/2021 | Ruan | H04L 9/0825 |
| 2022/0286301 | A1 * | 9/2022 | Omori | H04L 9/3247 |

FOREIGN PATENT DOCUMENTS

| | | | | |
|---|---|---|---|---|
| WO | 2008045773 | | 4/2008 | |
| WO | WO-2008045773 | A2 * | 4/2008 | ......... H04L 63/0442 |
| WO | WO-2020163210 | A1 * | 8/2020 | ........... H04L 9/0637 |

OTHER PUBLICATIONS

"International Application Serial No. PCT/EP2022/075147, International Search Report mailed Jan. 2, 2023", 4 pgs.
"International Application Serial No. PCT/EP2022/075147, Written Opinion mailed Jan. 2, 2023", 5 pgs.
"A Secure Authenticated Key Agreement Protocol for Wireless Security", Information Assurance and Security, 2007. IAS 2007. Third International Symposium n, IEEE, Pi, (Aug. 1, 2007), 33-38.

* cited by examiner

*Primary Examiner* — Darshan I Dhruv
(74) *Attorney, Agent, or Firm* — Schwegman Lundberg & Woessner, P.A.

(57) ABSTRACT

A method for creating a secure channel between devices for secure communication therebetween. The method comprises transmitting a first nonce from an initiator device to a responder device; receiving, at the initiator device, a second nonce and an identity of the responder device; transmitting an identity of the initiator device and a first set of one or more encrypted data objects from the initiator device to the responder device; receiving, at the initiator device, a second set of one or more encrypted data objects from the responder device; and generating, at the initiator device, a session key for secure communication between the initiator and responder devices.

20 Claims, 5 Drawing Sheets

FAST BILATERAL KEY CONFIRMATION

TECHNICAL FIELD

Embodiments described herein generally relate to techniques for creating a secure channel or secure session for secure communication or secure messaging.

BACKGROUND

There are many applications for which secure communication or secure messaging between devices is desirable. Some examples include physical and logical access control systems. Physical access control includes identification of authorized users or devices (e.g., vehicles, drones, etc.) and actuation of a gate, door, or other mechanism used to secure an area or actuation of a control mechanism, e.g., a physical or electronic/software control mechanism, permitting access to a secure physical asset, such as but not limited to a computing device (e.g., desktop computer, mobile device, wearable device, copier/printer, and the like). Logical access control includes identification of authorized users or devices to provide access to logical assets, such as but not limited to, an application, a cloud-based service, or a financial or personal account. It is often desirable for such communication between devices to be both fast and secure. For example, secure communication may involve messaging to send sensitive identification information between an authenticating device (e.g., access control reader or authentication system server) and a credential device (e.g., a smartcard or smartphone). Thus, it is desirable in many cases that the initial creation of a secure channel or session between devices for secure communication is completed quick and efficiently.

BRIEF SUMMARY

The following presents a simplified summary of one or more embodiments of the present disclosure in order to provide a basic understanding of such embodiments. This summary is not an extensive overview of all contemplated embodiments, and is intended to neither identify key or critical elements of all embodiments, nor delineate the scope of any or all embodiments.

The present disclosure, in one or more embodiments, relates to a method for creating a secure channel between devices for secure communication therebetween. The method comprises transmitting a first nonce from an initiator device to a responder device; receiving, at the initiator device, a second nonce and an identity of the responder device; transmitting an identity of the initiator device and a first set of one or more encrypted data objects from the initiator device to the responder device; receiving, at the initiator device, a second set of one or more encrypted data objects from the responder device; and generating, at the initiator device, a session key for secure communication between the initiator and responder devices.

The present disclosure, in one or more embodiments, additionally relates to a method for creating a secure channel between devices for secure communication therebetween. The method comprises receiving a first nonce from an initiator device at a responder device; transmitting a second nonce and an identity of the responder device from the responder device to the initiator device; receiving an identity of the initiator device and a first set of one or more encrypted data objects from the initiator device at the responder device; transmitting a second set of one or more encrypted data objects from the responder device to the initiator device; and generating, at the responder device, a session key for secure communication between the initiator and responder devices.

The present disclosure, in one or more embodiments, additionally relates to a non-transitory computer readable medium comprising executable program code, that when executed by one or more processors, causes the one or more processors to transmit a first nonce from an initiator device to a responder device; transmit a second nonce and an identity of the responder device from the responder device to the initiator device; transmit an identity of the initiator device and a first set of one or more encrypted data objects from the initiator device to the responder device; transmit a second set of one or more encrypted data objects from the responder device to the initiator device; and generate, at each of the initiator device and responder device, a session key for secure communication between the initiator and responder devices.

While multiple embodiments are disclosed, still other embodiments of the present disclosure will become apparent to those skilled in the art from the following detailed description, which shows and describes illustrative embodiments of the invention. As will be realized, the various embodiments of the present disclosure are capable of modifications in various obvious aspects, all without departing from the scope of the present disclosure. Accordingly, the drawings and detailed description are to be regarded as illustrative in nature and not restrictive.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings in which.

DETAILED DESCRIPTION

The present disclosure generally relates to techniques for quickly creating a secure channel or secure session for secure communication between devices, generally referred to herein as fast bilateral key confirmation. In general, fast bilateral key confirmation is designed to create a secure channel between devices using, for example, asymmetric keys, while access to any secure (physical or logical) asset(s)

can be granted with one or more subsequent authorization checks. Because access to any secure asset(s) can be granted with one or more subsequent authorization checks, for performance reasons, fast bilateral key confirmation may be defined using a relatively low number of scalar multiplications, thereby speeding up the creation of a secure channel or secure session.

Figure 1:
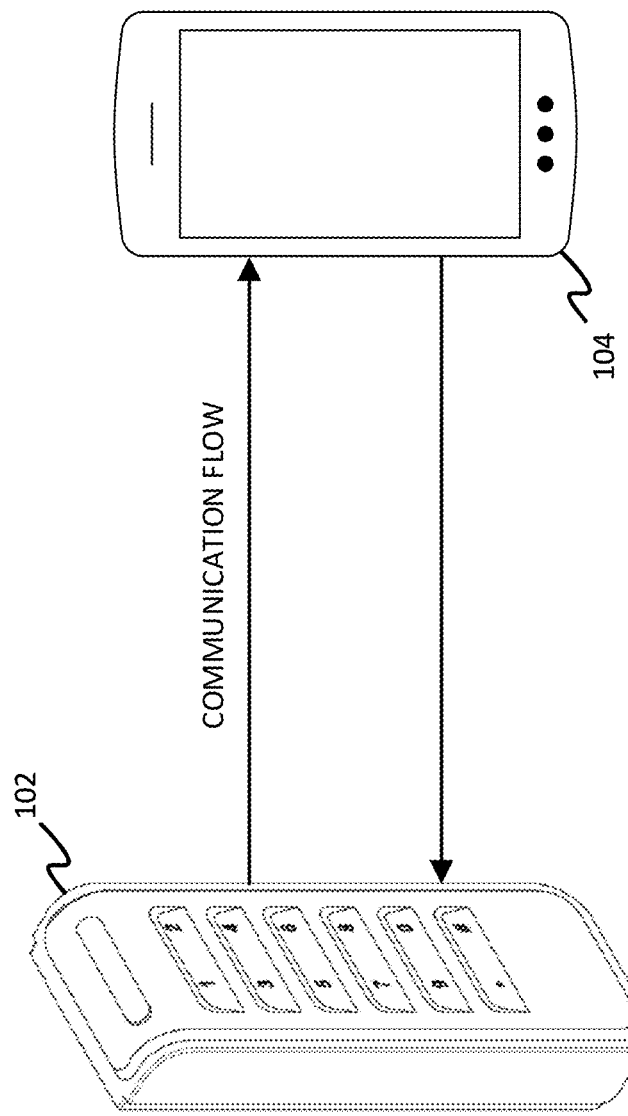
FIG. 1 illustrates an example of endpoint devices that can communicate using secure communication.

FIG. 1 illustrates an example of endpoint devices 102, 104 that can communicate using secure communication. In the example, endpoint device 102 is illustrated as an access control system reader and endpoint device 104 is illustrated as a mobile device, such as a smartphone. For example, endpoint device 102 may be a verifier device of an access control system and endpoint device 104 may be a credential device, such as but not limited to a radio frequency identification (RFID) card or fob, smartcard, or personal electronic device, such as a mobile phone, that may store an access credential that provides controlled access to a secure asset or resource, such as a financial resource or a secured physical space, secured by the verifier device. However, either endpoint device can be any device that desires creation of a secure channel or secure session with another device for secure communication therebetween.

Figure 2:
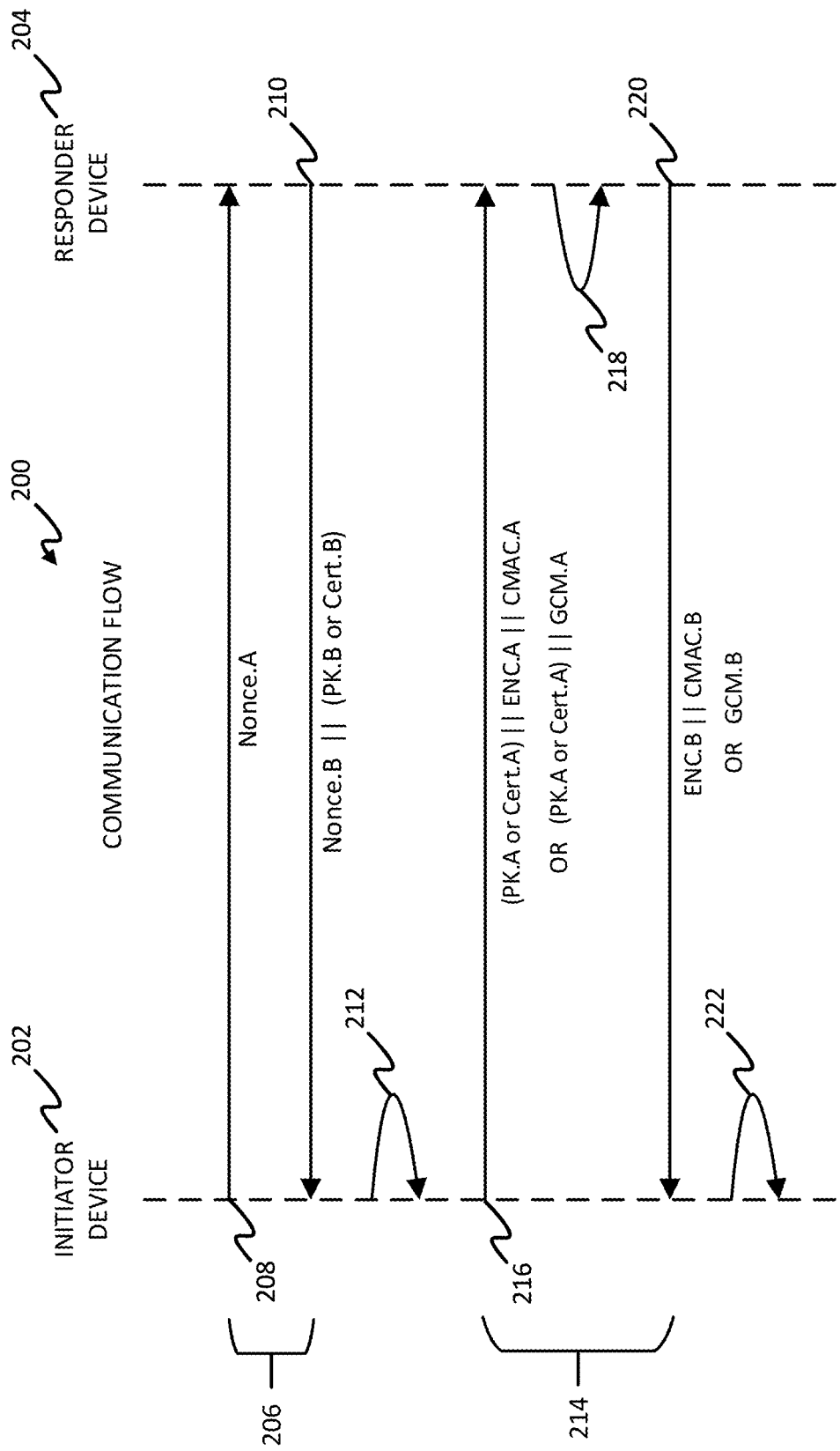
FIG. 2 illustrates an example communication flow between two endpoint devices for creating a secure channel or secure session for secure communication therebetween.

FIG. 2 illustrates an example communication flow 200 between two endpoint devices for creating a secure channel or secure session for secure communication therebetween, according to the present disclosure, i.e., fast bilateral key confirmation. The endpoint devices in the communication flow 200 are referred to herein as the initiator device 202 and the responder device 204. Any of the endpoint devices described herein, such as those described for example with regard to FIGS. 1 and 3, may be either an initiator device 202 or a responder device 204.

Initiator device 202 holds or stores the following information:

An initiator device asymmetric device key pair. The asymmetric key pair may include a secret key, SK, and a public key, PK. This may be represented by the following expression: K.A=(SK.A, PK.A), in which K.A is the asymmetric key pair of the initiator device (or device "A"), SK.A is the secret key of the asymmetric key pair of the initiator device, and PK.A is the public key of the asymmetric key pair of the initiator device.

An optional root key (root key 1) of a certification authority (CA), which may be represented as K.CA1.

An optional public key certificate, which may be a public key signed by a certification authority, and which may be represented by the following expression: Cert.A= (PK.CA2, PK.A), in which Cert.A is the public key certificate, PK.CA2 is the public key which is used to verify the signature of the signing certification authority (e.g., CA2), and PK.A is the public key of the asymmetric key pair of the initiator device. The public key certificate proves that the initiator device is an approved owner of the public key, PK.A.

Responder device 204 holds or stores the following information:

A responder device asymmetric device key pair. The asymmetric key pair may include a secret key, SK, and a public key, PK. This may be represented by the following expression: K.B=(SK.B, PK.B), in which K.B is the asymmetric key pair of the responder device (or device "B"), SK.B is the secret key of the asymmetric key pair of the responder device, and PK.B is the public key of the asymmetric key pair of the responder device.

An optional root key (root key 2) of a certification authority (CA), which may be represented as K.CA2.

An optional public key certificate, which may be a public key signed by a certification authority, and which may be represented by the following expression: Cert.B= (PK.CA1, PK.B), in which Cert.B is the public key certificate, PK.CA1 is the public key which is used to verify the signature of the signing certification authority (e.g., CA1), and PK.B is the public key of the asymmetric key pair of the responder device. The public key certificate proves that the responder device is an approved owner of the public key, PK.B.

As illustrated in FIG. 2, fast bilateral key confirmation may utilize two command-response pairs between the initiator and responder devices 202, 204 to achieve mutual key confirmation. The key confirmation of both devices 202, 204 can be proven by an encrypted exchange of nonces. More specifically, as part of a first command-response pair 206, in step 208, initiator device 202 transmits a first nonce, Nonce.A, to responder device 204. As used herein, in addition to any conventional meaning(s) and use(s) of the term "nonce," a nonce is intended to generally include an arbitrary value or alphanumeric string that can be used just once in a communication, ensuring that old communications cannot be reused in, for example, replay attacks. In some examples, any other suitable or desired data may also be transmitted from initiator device 202 to responder device 204 with Nonce.A. In step 210, in response to receiving Nonce.A from initiator device 202, responder device 204 transmits a second nonce, Nonce.B, along with an identity or identifier for the responder device, which may be either its public key, PK.B, or public key certificate, Cert.B. In an example, responder device 204 transmits Nonce.B concatenated or otherwise combined with either its public key, PK.B, or public key certificate, Cert.B, which may be represented by the expression: Nonce.B∥(PK.B or Cert.B). In some examples, any other suitable or desired data may also be transmitted from responder device 204 to initiator device 202 with Nonce.B and the public key, PK.B, or public key certificate, Cert.B. Any suitable method or algorithm may be used for determining a nonce value, such as Nonce.A and Nonce.B. In some examples, Nonce.A and/or Nonce.B may each be simply be a random or pseudo random number.

In step 212, initiator device 202 may validate the identity or identifier of the responder device 204, such as the public key, PK.B, or public key certificate, Cert.B, received in step 210 and, as part of a second command-response pair 214, in step 216, initiator device 202 transmits an identity or identifier for the initiator device, which may be either its public key, PK.A, or public key certificate, Cert.A, along with one or more encrypted data objects to responder device 204. In an example, the one or more encrypted data objects includes a first encrypted data object, ENC.A, and a second encrypted data object, CMAC.A. In an example, initiator device 202 transmits either its public key, PK.A, or public key certificate, Cert.A, concatenated or otherwise combined with the first encrypted data object, ENC.A, and further concatenated or otherwise combined with the second encrypted data object, CMAC.A, which may be represented by the expression: (PK.A or Cert.A)∥ENC.A∥CMAC.A. In some examples, any other suitable or desired data may also be transmitted from initiator device 202 to responder device 204 with ENC.A, CMAC.A, and the public key, PK.A, or public key certificate, Cert.A.

In an example, the first encrypted data object, ENC.A, may be determined according to the following expression:

$$ENC.A = ENC_1(K_S.ENC, Nonce.B \| [TextA] \| Padding),$$

where $ENC_1(K, data)$ is an algorithm or function that encrypts the "data" parameter using the key, K, parameter, $K_S.ENC$ is an encryption key that may be used as a session key during the subsequent secure communication or secure messaging, [TextA] is an optional parameter and may contain any desired data, such as application specific data, and Padding corresponds to any additional padding, if required or desired, and may be optional in some embodiments. Any encryption algorithm or function may be used for $ENC_1(K, data)$. In an example, $ENC_1(K, data)$ is a block cipher mode of operation, such as but not limited to ECB (Electronic Code Block), CBC (Cipher Block Chaining), OFB (Output Feedback), CFB (Cipher Feedback), CTR (Counter), XTS (XEX-based tweaked-codebook mode with ciphertext stealing), etc. In an example, $ENC_1(K, data)$ is a block cipher operation in CBC mode. Any padding algorithm may be used to determine the Padding, if required or desired. In some examples, any other suitable or desired data may be included as part of the "data" parameter for $ENC_1(K, data)$, and the present disclosure is not limited to only the foregoing example.

An initialization vector, ENC.A IV, for determining ENC.A may be determined in any suitable manner desired, using for example, any suitable algorithm and desired input parameters. In an example, the initialization vector, ENC.A IV, may be determined according to the following expression:

$$ENC.A\ IV = ENC_2(K_S.MAC, Nonce.A),$$

where $ENC_2(K, data)$ is an algorithm or function that encrypts the "data" parameter using the key, K, parameter and $K_S.MAC$ is an encryption key that may also be used as a session key during the subsequent secure communication or secure messaging. Again, any encryption algorithm or function may be used for $ENC_2(K, data)$. In an example, $ENC_2(K, data)$ is also a block cipher mode of operation, such as but not limited to ECB, CBC, OFB, CFB, CTR, XTS, etc. In an example, $ENC_2(K, data)$ is a block cipher operation in ECB mode. In some examples, any other suitable or desired data may be included as part of the "data" parameter to $ENC_2(K, data)$, and the present disclosure is not limited to only the foregoing example.

Any key derivation function may be used to determine encryption keys $K_S.ENC$ and $K_S.MAC$. In an example, encryption keys $K_S.ENC$ and $K_S.MAC$ are a set of symmetric encryption keys ($K_S.ENC$, $K_S.MAC$) that are determined separately by each of the initiator device 202 and responder device 204. In, at, or around either step 212 or 216, initiator device 202 may determine symmetric encryption keys $K_S.ENC$ and $K_S.MAC$ according to the following expressions:

$$K_S.ENC = KDF(Z.A, DC.1, Identity.A, Identity.B, Nonce.A, Nonce.B, [Context]);\ and$$

$$K_S.MAC = KDF(Z.A, DC.2, Identity.A, Identity.B, Nonce.A, Nonce.B, [Context]),$$

where KDF( ) is a suitable key derivation function that derives one or more secret keys from one or more input parameters, Z.A is a shared secret, DC.1 and DC.2 are derivation constants and are fixed values in which DC.1 does not equal DC.2, Identity.A is a parameter indicating the identity of the initiator device 202, such as the public key, PK.A, or public key certificate, Cert.A, Identity.B is a parameter indicating the identity of the responder device 204, such as the public key, PK.B, or public key certificate, Cert.B, and [Context] is an optional parameter and may contain any desired data, such as context specific data. The shared secret, Z.A, may be determined using any suitable method, such as using any suitable asymmetric algorithm. In an example, the shared secret, Z.A, may be determined according to the following expression:

$$Z.A = ECDH(PK.B, SK.A),$$

where ECDH(key.1, key.2) is an Elliptic Curve Diffie Hellman operation using first and second key parameters, key.1, key.2. In this example, key.1 is the public key, PK.B, of the responder device 204, and key.2 is the secret key, SK.A, held by the initiator device 202.

In an example, the second encrypted data object, CMAC.A, may be determined according to the following expression:

$$CMAC.A = CMAC(K_S.MAC, ENC.A),$$

where CMAC(K, data) is an algorithm or function that encrypts the "data" parameter using the key, K, parameter. Any encryption algorithm or function may be used for CMAC(K, data). In an example, CMAC(K, data) is a message authentication code algorithm or block-cipher-based message authentication code algorithm, such as CMAC (Cipher-based Message Authentication Code). In some examples, any other suitable or desired data may be included as part of the "data" parameter to CMAC(K, data), and the present disclosure is not limited to only the foregoing example.

In step 218, in response to receiving the transmission in step 216 from initiator device 202, responder device 204 may validate the identity or identifier of the initiator device 202, such as the public key, PK.A, or public key certificate, Cert.A, and check or verify the one or more encrypted data objects received in step 216. For example, responder device 204 may check or verify the second encrypted data object, CMAC.A, decrypt the first encrypted data object, ENC.A, using a corresponding decryption algorithm, and check or verify the nonce, Nonce.B. Upon verifying, for example, the second encrypted data object, CMAC.A, and the nonce, Nonce.B, in step 220, responder device 204 transmits one or more encrypted data objects to initiator device 202. In an example, the one or more encrypted data objects includes a third encrypted data object, ENC.B, and a fourth encrypted data object, CMAC.B. In an example, responder device 204 transmits the third encrypted data object, ENC.B, concatenated or otherwise combined with the fourth encrypted data object, CMAC.B, which may be represented by the expression: ENC.B||CMAC.B. In some examples, any other suitable or desired data may also be transmitted from responder device 204 to initiator device 202 with ENC.B and CMAC.B.

In an example, the third encrypted data object, ENC.B, may be determined according to the following expression:

$$ENC.B = ENC_1(K_S.ENC, Nonce.A || [TextB] || Padding),$$

where [TextB] is an optional parameter and may contain any desired data, such as application specific data. In some examples, any other suitable or desired data may be included as part of the "data" parameter to $ENC_1(K, data)$, and the present disclosure is not limited to only the foregoing example. An initialization vector, ENC.B IV, for determining ENC.B may be determined in any suitable manner desired, using for example, any suitable algorithm and desired input parameters. In an example, the initialization vector, ENC.B IV, may be determined according to the following expression:

$$ENC.B\ IV = ENC_2(K_S.MAC, Nonce.B).$$

In some examples, any other suitable or desired data may be included as part of the "data" parameter to $ENC_2(K, data)$, and the present disclosure is not limited to only the foregoing example.

As indicated above, any key derivation function may be used to determine encryption keys $K_S.ENC$ and $K_S.MAC$. As also indicated above, in an example, encryption keys $K_S.ENC$ and $K_S.MAC$ are a set of symmetric encryption keys ($K_S.ENC$, $K_S.MAC$) that are determined separately by each of the initiator device 202 and responder device 204. In, at, or around either step 218 or 220, responder device 204 may determine symmetric encryption keys $K_S.ENC$ and $K_S.MAC$ according to the following expressions:

$K_S.ENC=KDF(Z.B,DC.1,Identity.A,Identity.B,Nonce.A,Nonce.B,[Context])$; and $K_S.MAC=KDF(Z.B,DC.2,Identity.A,Identity.B,Nonce.A,Nonce.B,[Context])$, where Z.B is a shared secret. The shared secret, Z.B, may be determined using any suitable method, such as using any suitable asymmetric algorithm. In an example, the shared secret, Z.B, may be determined according to the following expression:

$Z.B=ECDH(PK.A,SK.B)$.

In this example, key.1 is the public key, PK.A, of the initiator device 202, and key.2 is the secret key, SK.B, held by the responder device 204.

In an example, the fourth encrypted data object, CMAC.B, may be determined according to the following expression:

$CMAC.B=CMAC(K_S.MAC,ENC.B)$.

In some examples, any other suitable or desired data may be included as part of the "data" parameter to CMAC(K, data), and the present disclosure is not limited to only the foregoing example.

In step 222, in response to receiving transmission 220 from responder device 204, initiator device 202 may check or verify the one or more encrypted data objects received in step 220. For example, initiator device 202 may check or verify the fourth encrypted data object, CMAC.B, decrypt the third encrypted data object, ENC.B, using a corresponding decryption algorithm, and check or verify the nonce, Nonce.A.

In some example embodiments, instead of determining and transmitting separate encrypted data objects, e.g., ENC.A/ENC.B and CMAC.A/CMAC.B, in the second command-response pair 214, a single authenticated encryption (AE) algorithm, such as but not limited to GCM (Galois/Counter Mode) or GMAC (Galois Message Authentication Code), may be used to generate a single encrypted data object. In such case, in step 216, in the place of ENC.A and CMAC.A, initiator device 202 may transmit a single alternate encrypted data object, GCM.A, encrypting Nonce.B and [TextA], along with any other suitable or desired data, such as Padding, using a suitable authentication encryption algorithm. In step 218, responder device 204 may decrypt and validate GCM.A and check or verify the nonce, Nonce.B. In step 220, in the place of ENC.B and CMAC.B, responder device 204 may transmit a single alternate encrypted data object, GCM.B, encrypting Nonce.A and [TextB], along with any other suitable or desired data, such as Padding, using a suitable authentication encryption algorithm. In step 222, initiator device 202 may decrypt and validate GCM.A and check or verify the nonce, Nonce.A.

Subsequent step 222, one or more of the session key(s), $K_S$, such as but not limited to the set of symmetric encryption keys ($K_S.ENC$, $K_S.MAC$), may then be used for secure communication or secure messaging between the initiator device 202 and responder device 204, as would be understood by those skilled in the art. The session key(s), $K_S$, is/are used for only one session. The session key(s), $K_S$, is/are then discarded, and a new key or keys is/are generated for any subsequent session.

As indicated previously, there are many applications for which secure communication or secure messaging between devices is desirable, and thus for which fast bilateral key confirmation, as described herein, may be suitable. Some examples include physical and logical access control systems. In general, access control covers a range of systems and methods to govern access, for example by people, to secure areas or secure assets. Physical access control includes identification of authorized users or devices (e.g., vehicles, drones, etc.) and actuation of a gate, door, or other mechanism used to secure an area or actuation of a control mechanism, e.g., a physical or electronic/software control mechanism, permitting access to a secure physical asset, such as but not limited to a computing device (e.g., desktop computer, mobile device, wearable device, copier/printer, and the like). Logical access control includes identification of authorized users or devices to provide access to logical assets, such as but not limited to, an application, a cloud-based service, or a financial or personal account. Physical access control systems (PACS) and logical access control systems (LACS) can generally include a reader (e.g., an online or offline reader) that holds authorization data and can be capable of determining whether credentials (e.g., from credential or key devices such as RFID chips in cards and fobs or personal electronic devices such as mobile phones) are authorized for accessing the secure area or asset. Alternatively, PACS/LACS can include a host server to which readers are operably connected (e.g., via a controller) in a centrally managed configuration. In centrally managed configurations, readers can obtain credentials from credential or key devices and pass those credentials to the PACS/LACS host server. The host server can then determine whether the credentials authorize access to the secure area or secure asset and command the actuator or other control mechanism accordingly or can command the reader to operate the actuator or other control mechanism accordingly. Wireless PACS/LACS, e.g., those that utilize wireless communication between the reader and the credential or key device, such as for secure credential exchange, can use RFID or personal area network (PAN) technologies, such as the IEEE 802.15.1, Bluetooth, Bluetooth Low Energy (BLE), near field communications (NFC), ZigBee, GSM, CDMA, Wi-Fi, ultrawide band (UWB), etc.

Figure 3:
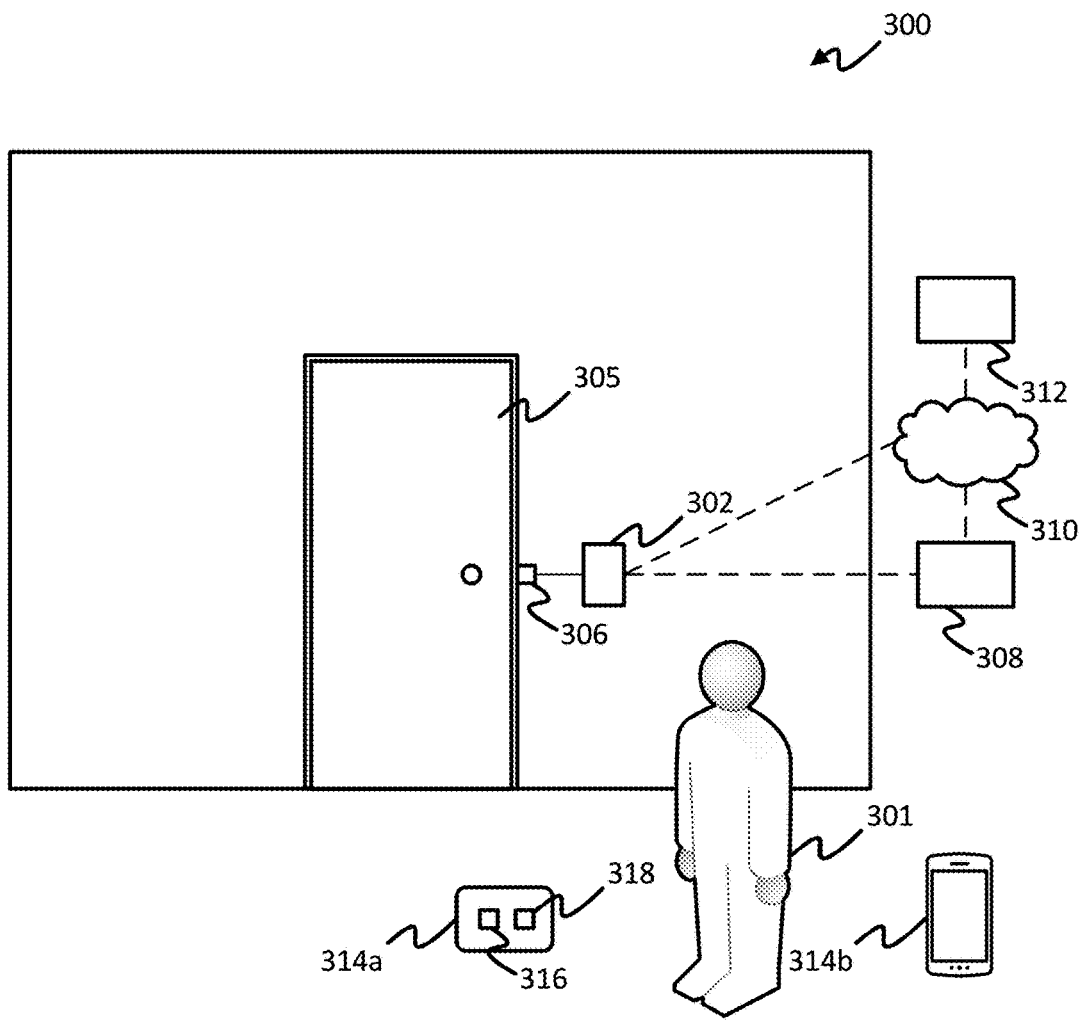
FIG. 3 illustrates a front view of an example access control system (ACS), or portions thereof, including an ACS reader, an ACS control panel, an ACS host server, and a credential, any of which may operate as an endpoint device as described herein.
Figure 4:
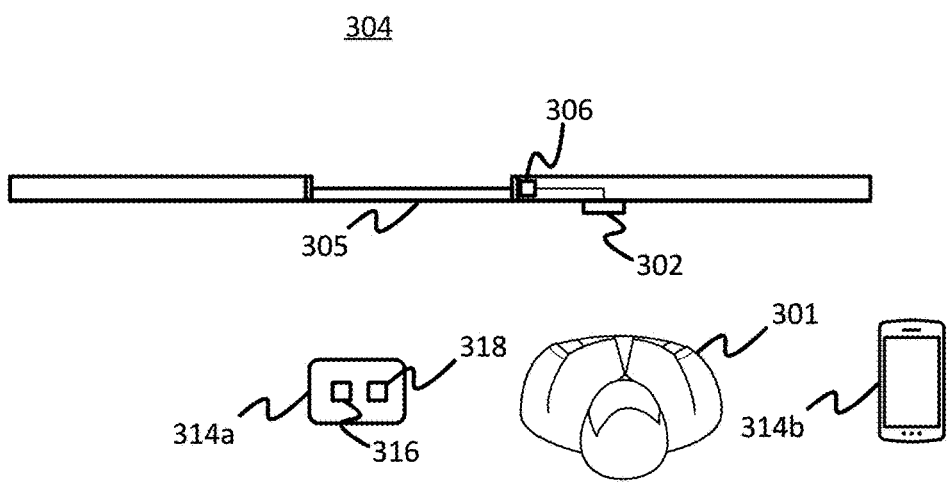
FIG. 4 illustrates a top cross-sectional view of an example ACS, or portions thereof.

FIGS. 3 and 4 illustrate an example access control system (ACS) 300, or portions thereof. While FIGS. 3 and 4 primarily illustrate a PACS, it is recognized that the present disclosure similarly relates to LACS, and that while the secure asset in FIGS. 3 and 4 is illustrated as a secure area surrounded by a wall and protected by a physical access point (e.g., a door) and the control mechanism is described as a locking mechanism, the secure asset could instead be a logical asset (e.g., an application, a cloud-based service, or a financial or personal account), the control mechanism could be an electronic/software control mechanism separate from or incorporated with the reader device, and the reader device need not be fixed and could include a device owned or operated by the user, such as a mobile device (e.g., smart phone, tablet, or the like).

ACS 300 can include a reader device, or simply reader, 302 associated with a secure area, access point, or other asset 304. In some cases, such as in the example illustrated in FIG. 3, secure asset 304 is a secure area secured by an access point 305, such as a door, gate, turnstile or the like controlling or permitting authorized access to the secure area, but as explained above, secure asset 304 may alternatively be a logical asset. Reader 302 can include or be operably connected with a control mechanism 306, such as but not limited to a locking mechanism in the case of PACS or an electronic/software control mechanism in the case of LACS, that controls whether access via access point 306 is permitted (e.g., can be opened or accessed) or may even control opening and/or closing of the access point. Reader 302 can be an offline reader, e.g., a reader not connected to a control panel or host server, and in such cases may make its own access control determinations and directly operate or command control mechanism 306, accordingly. Reader 302 can be a wireless reader device, in that the reader may communicate with credential or key devices via wireless technologies, such as RFID or PAN technologies, such as the IEEE 802.15.1, Bluetooth, Bluetooth Low Energy (BLE), near field communications (NFC), ZigBee, GSM, CDMA, Wi-Fi, UWB, etc. Reader 302 may also include a PIN pad, touch screen, fingerprint reader, magnetic stripe reader, chip reader, or other non-wireless input means for receiving credential or other information, such as a PIN or other secret code, biometric information such as a fingerprint, or information from a magnetic stripe card or chip card, for example. Reader 302 may also include facial recognition capabilities.

In some cases, reader 302 can be connected by wire or wirelessly to a control panel 308. In such cases, reader 302 may transmit credential information to control panel 308, and the control panel may make, or may share responsibilities with the reader in making, access control determinations. Based on the access control determinations, control panel 308 can instruct reader 302 to operate or command control mechanism 306, accordingly. Alternately, control panel 308 can be connected directly or wirelessly to control mechanism 306, and in such cases may directly operate or command the control mechanism, accordingly, bypassing reader 302.

In some cases, reader 302 and control panel 308, and even control mechanism 306, can be connected to a wired or wireless network 310 and communicate with each other, as described above, via the network. Example networks can include a local area network (LAN), a wide area network (WAN), a packet data network (e.g., the Internet), mobile telephone networks (e.g., cellular networks), Plain Old Telephone (POTS) networks, wireless data networks (e.g., IEEE 802.11 family of standards known as Wi-Fi or IEEE 802.16 family of standards known as WiMax), IEEE 802.15.4 family of standards, and peer-to-peer (P2P) networks, among others. If ACS 300 is managed by a remote system, the ACS can include a host server 312 connected by wire or wirelessly to network 310 and that may communicate with reader 302 and/or control panel 308. In such cases, reader 302 can transmit credential information to host server 312 via network 310 or can transmit credential information to control panel 308, which can then transmit the credential information to the host server via the network. Host server 312 may make, or may share responsibilities with reader 302 and/or control panel 308 in making, access control determinations. Based on the access control determinations, host server 312 can instruct reader 302, directly or indirectly via control panel 308, to operate or command control mechanism 306, accordingly. Alternately, host server 312 can instruct control panel 308 to operate or command control mechanism 306, accordingly. In still another example, host server 312 can be connected via network 310 to control mechanism 306 and directly operate or command the control mechanism, accordingly, bypassing reader 302 and control panel 308.

Figure 5:
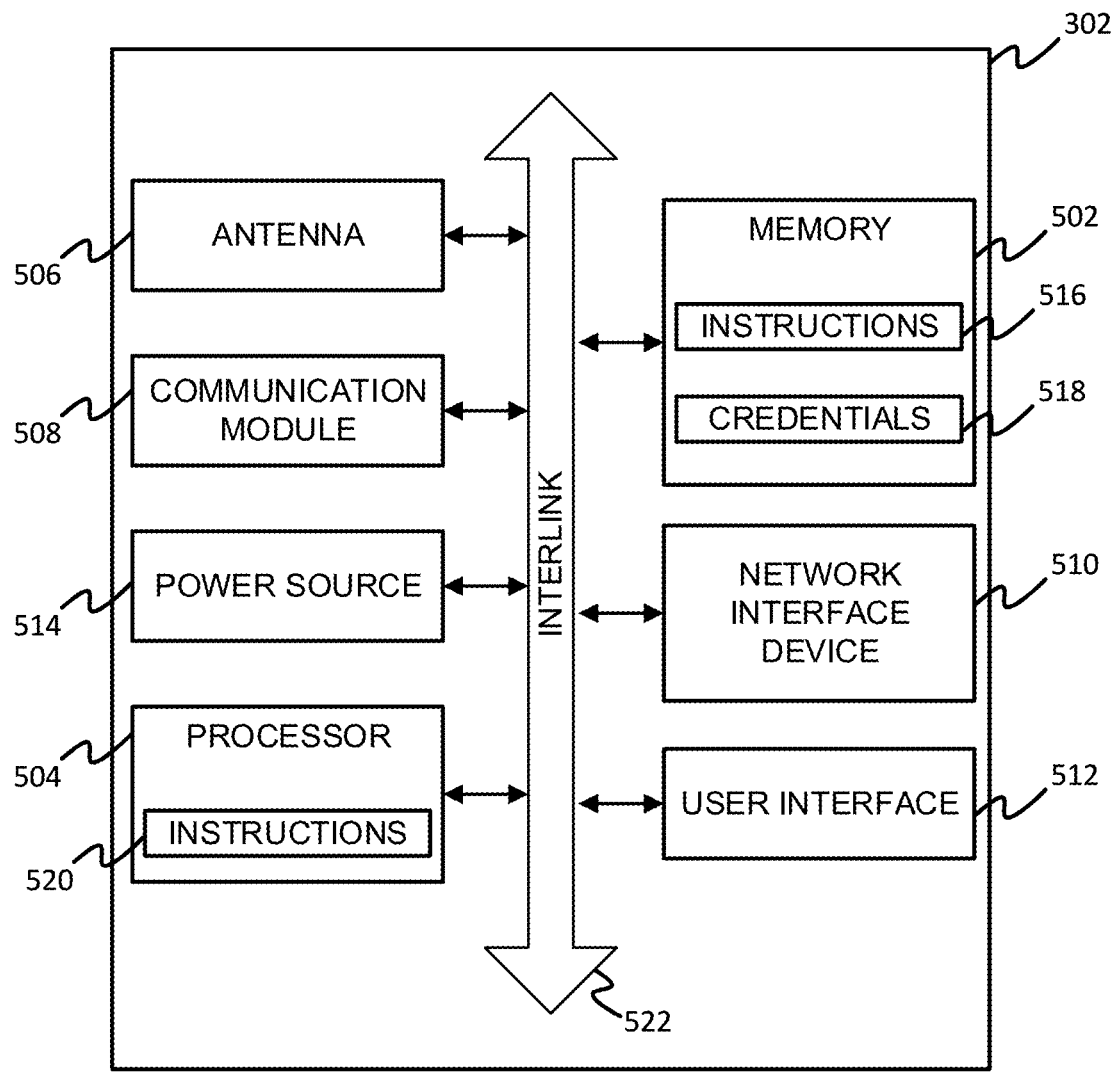
FIG. 5 illustrates a block diagram schematic of various components of an example ACS reader.

FIG. 5 illustrates a block diagram schematic of various components of an example reader 302. In general, reader 302 can include one or more of a memory 502, a processor 504, one or more antennas 506, a communication module 508, a network interface device 510, a user interface 512, and a power source or supply 514. While reader 302 is illustrated in FIG. 3 as a device affixed to a surface, for example a wall, reader 302 may also be a free-standing device or a portable device, such as but not limited to a mobile device. Moreover, in some example embodiments, such as but not limited to certain LACS embodiments, reader 302 may be a mobile device of the user, wherein, for example, the user may be attempting to access a logical asset via the user's own mobile device.

Memory 502 can be used in connection with the execution of application programming or instructions by processor 504, and for the temporary or long-term storage of program instructions or instruction sets 516 and/or credential or authorization data 518, such as credential data, credential authorization data, access control data or instructions, or instructions for establishing a secure channel or secure session for secure communication or secure messaging (e.g., secure exchange of credential data) using, for example, fast bilateral key confirmation as described herein. For example, memory 502 can contain executable instructions 516 that are used by the processor 504 to run other components of reader 302 and/or to establish a secure channel (e.g., using fast bilateral key confirmation as described herein) and make access determinations based on credential or authorization data 518. Memory 502 can comprise a computer readable medium that can be any medium that can contain, store, communicate, or transport data, program code, or instructions for use by or in connection with reader 302. The computer readable medium can be, for example but is not limited to, an electronic, magnetic, optical, electromagnetic, infrared, or semiconductor system, apparatus, or device. More specific examples of suitable computer readable medium include, but are not limited to, an electrical connection having one or more wires or a tangible storage medium such as a portable computer diskette, a hard disk, a random access memory (RAM), a read-only memory (ROM), an erasable programmable read-only memory (EPROM or EEPROM), Dynamic RAM (DRAM), any solid-state storage device, in general, a compact disc read-only memory (CD-ROM), or other optical or magnetic storage device. Computer readable media includes, but is not to be confused with, computer readable storage medium, which is intended to cover all physical, non-transitory, or similar embodiments of computer readable media.

Processor 504 can correspond to one or more computer processing devices or resources. For instance, processor 504 can be provided as silicon, as a Field Programmable Gate Array (FPGA), an Application-Specific Integrated Circuit (ASIC), any other type of Integrated Circuit (IC) chip, a collection of IC chips, or the like. As a more specific example, processor 504 can be provided as a microprocessor, Central Processing Unit (CPU), or plurality of microprocessors or CPUs that are configured to execute instructions sets stored in an internal memory 520 and/or memory 502.

Antenna 506 can correspond to one or multiple antennas and can be configured to provide for wireless communications between, for example, reader 302 and a credential or key device. Antenna(s) 506 can be arranged to operate using one or more wireless communication protocols and operating frequencies including, but not limited to, the IEEE 802.15.1, Bluetooth, Bluetooth Low Energy (BLE), near field communications (NFC), ZigBee, GSM, CDMA, Wi-Fi, RF, UWB, and the like. By way of example, antenna(s) 506 can be RF antenna(s), and as such, may transmit/receive RF signals through free-space to be received/transferred by a credential or key device having an RF transceiver.

Communication module 508 can be configured to communicate according to any suitable communications protocol with one or more different systems or devices either remote or local to reader 302, such as one or more control mechanisms 306 or control panel 308.

Network interface device 510 includes hardware to facilitate communications with other devices, such as control panel 308 or host server 312, over a communication network, such as network 310, utilizing any one of a number of transfer protocols (e.g., frame relay, internet protocol (IP), transmission control protocol (TCP), user datagram protocol (UDP), hypertext transfer protocol (HTTP), etc.). Example communication networks can include a local area network (LAN), a wide area network (WAN), a packet data network (e.g., the Internet), mobile telephone networks (e.g., cellular networks), Plain Old Telephone (POTS) networks, wireless data networks (e.g., IEEE 802.11 family of standards known as Wi-Fi or IEEE 802.16 family of standards known as WiMax), networks based on the IEEE 802.15.4 family of standards, and peer-to-peer (P2P) networks, among others. In some examples, network interface device 510 can include an Ethernet port or other physical jack, a Wi-Fi card, a Network Interface Card (NIC), a cellular interface (e.g., antenna, filters, and associated circuitry), or the like. In some examples, network interface device 510 can include one or more antennas to wirelessly communicate using, for example, at least one of single-input multiple-output (SIMO), multiple-input multiple-output (MIMO), or multiple-input single-output (MISO) techniques.

User interface 512 can include one or more input devices and/or display devices. Examples of suitable user input devices that can be included in user interface 512 include, without limitation, one or more buttons, a keyboard, a mouse, a touch-sensitive surface, a stylus, a camera, a microphone, a PIN pad, touch screen, fingerprint reader, magnetic stripe reader, chip reader, etc. Examples of suitable user output devices that can be included in user interface 512 include, without limitation, one or more LEDs, a LCD panel, a display screen, a touchscreen, one or more lights, a speaker, etc. It should be appreciated that user interface 512 can also include a combined user input and user output device, such as a touch-sensitive display or the like.

Power source 514 can be any suitable internal power source, such as a battery, capacitive power source or similar type of charge-storage device, etc., and/or can include one or more power conversion circuits suitable to convert external power into suitable power (e.g., conversion of externally-supplied AC power into DC power) for components of the reader 302. Power source 514 can also include some implementation of surge protection circuitry to protect the components of reader 302 from power surges.

Reader 302 can also include one or more interlinks or buses 522 operable to transmit communications between the various hardware components of the reader. A system bus 522 can be any of several types of commercially available bus structures or bus architectures.

Figure 6:
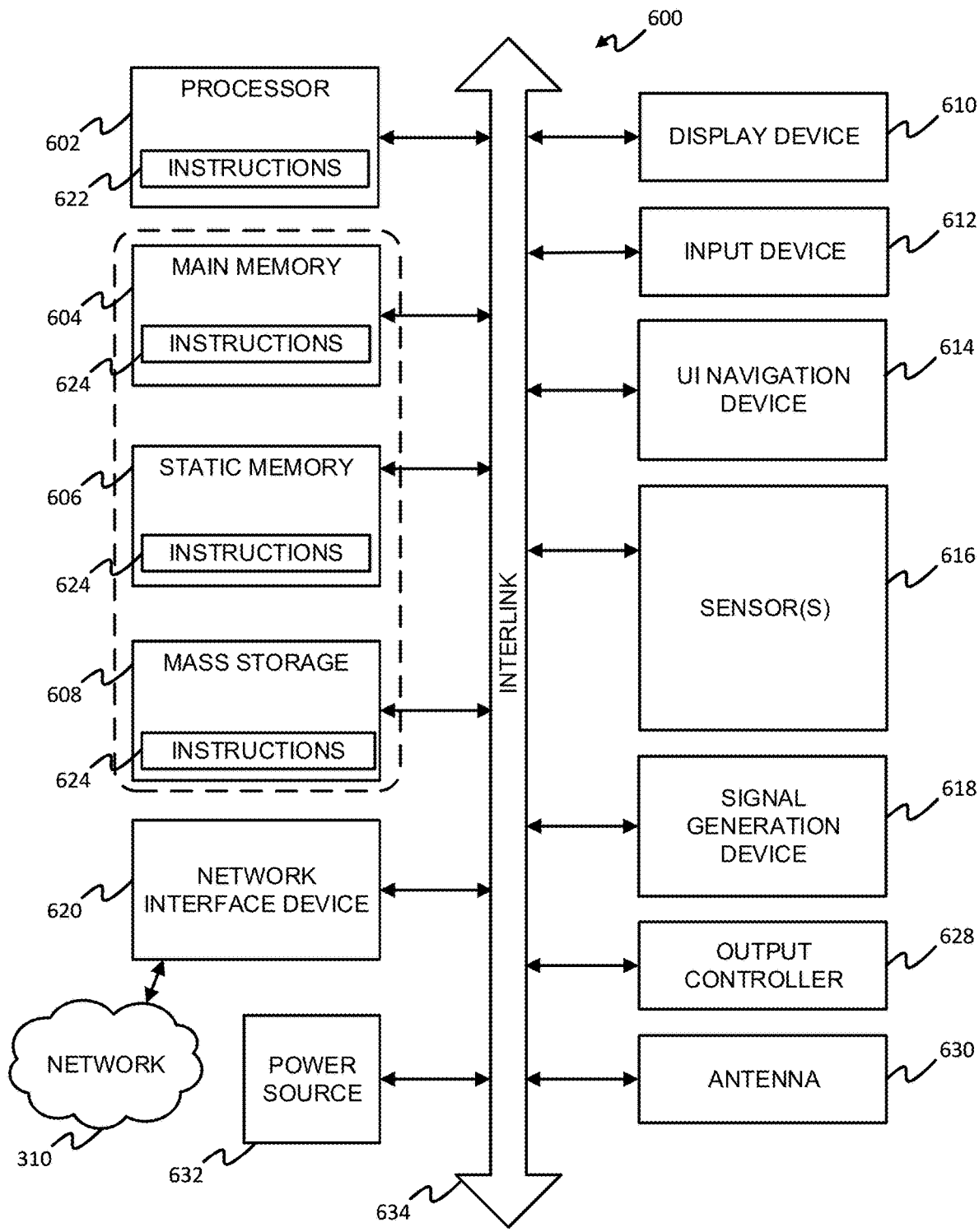
FIG. 6 illustrates a block diagram schematic of various example components of an example machine that may be used as, for example, an ACS control panel or ACS host server.

FIG. 6 illustrates a block diagram schematic of various example components of an example machine 600 that can be used as, for example, control panel 308 and/or host server 312. Examples, as described herein, can generally include, or can operate by, logic or a number of components, modules, or mechanisms in machine 600. Modules may be hardware, software, or firmware communicatively coupled to one or more processors in order to carry out the operations described herein. Generally, circuitry (e.g., processing circuitry) of example machine 600 may include a collection of circuits implemented in tangible entities of the machine 600 that include hardware (e.g., simple circuits, gates, logic, etc.). Circuitry membership can be flexible over time. Circuitries include members that can, alone or in combination, perform specified operations when operating. In some examples, hardware of the circuitry can be immutably designed to carry out a specific operation (e.g., hardwired). In some examples, the hardware of the circuitry can include variably connected physical components (e.g., execution units, transistors, simple circuits, etc.) including a machine readable medium physically modified (e.g., magnetically, electrically, moveable placement of invariant massed particles, etc.) to encode instructions of the specific operation. In connecting the physical components, the underlying electrical properties of a hardware constituent are changed, for example, from an insulator to a conductor or vice versa. The instructions permit embedded hardware (e.g., the execution units or a loading mechanism) to create members of the circuitry in hardware via the variable connections to carry out portions of the specific operation when in operation. Accordingly, in some examples, the machine readable medium elements are part of the circuitry or are communicatively coupled to the other components of the circuitry when the device is operating. In some examples, any of the physical components can be used in more than one member of more than one circuitry. For example, under operation, execution units can be used in a first circuit of a first circuitry at one point in time and reused by a second circuit in the first circuitry, or by a third circuit in a second circuitry at a different time. Additional and/or more specific examples of components with respect to machine 600 follow.

In some embodiments, machine 600 can operate as a standalone device or can be connected (e.g., networked) to other machines. In a networked deployment, machine 600 can operate in the capacity of a server machine, a client machine, or both in server-client network environments. In some examples, machine 600 can act as a peer machine in a peer-to-peer (P2P) (or other distributed) network environment. Machine 600 can be or include a personal computer (PC), a tablet PC, a set-top box (STB), a personal digital assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Machine (e.g., computer system) 600 can include a hardware processor 602 (e.g., a central processing unit (CPU), a graphics processing unit (GPU), a hardware processor core, or any combination thereof) and a main memory 604, a static memory (e.g., memory or storage for firmware, microcode, a basic-input-output (BIOS), unified extensible firmware interface (UEFI), etc.) 606, and/or mass storage 608 (e.g., hard drives, tape drives, flash storage, or other block devices) some or all of which can communicate with each other via an interlink (e.g., bus) 634. Machine 600 can further include a display device 610, an input device 612, and/or a user interface (UI) navigation device 614. Examples of suitable display devices include, without limitation, one or more LEDs, a LCD panel, a display screen, a touchscreen, one or more lights, etc. Example input devices and UI navigation devices include, without limitation, one or more buttons, a keyboard, a touch-sensitive surface, a stylus, a camera, a microphone, etc. In some examples, one or more of the display device 610, input device 612, and/or UI navigation device 614 can be a combined unit, such as a touch screen display. Machine 600 can additionally include a signal generation device 618 (e.g., a speaker), a network interface device 620, one or more antennas 630, a power source 632, and one or more sensors 616, such as a global positioning system (GPS) sensor, compass, accelerometer, or other sensor. Machine 600 can include an output controller 628, such as a serial (e.g., universal serial bus (USB)), parallel, or other wired or wireless (e.g., infrared (IR), NFC, etc.) connection to communicate with or control one or more peripheral devices (e.g., a printer, card reader, etc.).

Processor 602 can correspond to one or more computer processing devices or resources. For instance, processor 602 can be provided as silicon, as a Field Programmable Gate Array (FPGA), an Application-Specific Integrated Circuit (ASIC), any other type of Integrated Circuit (IC) chip, a collection of IC chips, or the like. As a more specific example, processor 602 can be provided as a microprocessor, Central Processing Unit (CPU), or plurality of microprocessors or CPUs that are configured to execute instructions sets stored in an internal memory 622 and/or memory 604, 606, 608.

Any of memory 604, 606, and 608 can be used in connection with the execution of application programming or instructions by processor 602 for performing any of the functionality or methods described herein, and for the temporary or long-term storage of program instructions or instruction sets 624 and/or other data for performing any of the functionality or methods described herein, such as for establishing a secure channel or secure session for secure communication or secure messaging (e.g., secure exchange of credential data) using, for example, fast bilateral key confirmation as described herein. Any of memory 604, 606, 608 can comprise a computer readable medium that can be any medium that can contain, store, communicate, or transport data, program code, or instructions 624 for use by or in connection with machine 600. The computer readable medium can be, for example but is not limited to, an electronic, magnetic, optical, electromagnetic, infrared, or semiconductor system, apparatus, or device. More specific examples of suitable computer readable medium include, but are not limited to, an electrical connection having one or more wires or a tangible storage medium such as a portable computer diskette, a hard disk, a random access memory (RAM), a read-only memory (ROM), an erasable programmable read-only memory (EPROM or EEPROM), Dynamic RAM (DRAM), a solid-state storage device, in general, a compact disc read-only memory (CD-ROM), or other optical or magnetic storage device. As noted above, computer readable media includes, but is not to be confused with, computer readable storage medium, which is intended to cover all physical, non-transitory, or similar embodiments of computer readable media.

Network interface device 620 includes hardware to facilitate communications with other devices over a communication network, such as network 310, utilizing any one of a number of transfer protocols (e.g., frame relay, internet protocol (IP), transmission control protocol (TCP), user datagram protocol (UDP), hypertext transfer protocol (HTTP), etc.). Example communication networks can include a local area network (LAN), a wide area network (WAN), a packet data network (e.g., the Internet), mobile telephone networks (e.g., cellular networks), Plain Old Telephone (POTS) networks, wireless data networks (e.g., IEEE 802.11 family of standards known as Wi-Fi or IEEE 802.16 family of standards known as WiMax), networks based on the IEEE 802.15.4 family of standards, and peer-to-peer (P2P) networks, among others. In some examples, network interface device 620 can include an Ethernet port or other physical jack, a Wi-Fi card, a Network Interface Card (NIC), a cellular interface (e.g., antenna, filters, and associated circuitry), or the like. In some examples, network interface device 620 can include one or more antennas to wirelessly communicate using, for example, at least one of single-input multiple-output (SIMO), multiple-input multiple-output (MIMO), or multiple-input single-output (MISO) techniques.

Antenna 630 can correspond to one or multiple antennas and can be configured to provide for wireless communications between machine 600 and another device. Antenna(s) 630 can be arranged to operate using one or more wireless communication protocols and operating frequencies including, but not limited to, the IEEE 802.15.1, Bluetooth, Bluetooth Low Energy (BLE), near field communications (NFC), ZigBee, GSM, CDMA, Wi-Fi, RF, UWB, and the like. By way of example, antenna(s) 630 can be RF antenna(s), and as such, may transmit/receive RF signals through free-space to be received/transferred by another device having an RF transceiver.

Power source 632 can be any suitable internal power source, such as a battery, capacitive power source or similar type of charge-storage device, etc., and/or can include one or more power conversion circuits suitable to convert external power into suitable power (e.g., conversion of externally-supplied AC power into DC power) for components of the machine 600. Power source 632 can also include some implementation of surge protection circuitry to protect the components of machine 600 from power surges.

As indicated above, machine 600 can include one or more interlinks or buses 634 operable to transmit communications between the various hardware components of the machine. A system bus 634 can be any of several types of commercially available bus structures or bus architectures.

With reference back to FIGS. 3 and 4, in use, as a user 301 having a credential or key device 314 (illustrated, for example, as a smartcard 314a or mobile device 314b) approaches reader 302 associated with access point 305, the credential device 314 may communicate the user's credential or credential data to the reader, for example, via a suitable RFID or PAN technology. In general, a credential device 314 may include any device that carries evidence of authority, status, rights, and/or entitlement to privileges for a holder of the credential device. A credential device 314 can be a portable device having memory 316, storing one or more user credentials or credential data, and a reader interface (i.e., an antenna and Integrated Circuit (IC) chip) 318, which permits the credential to exchange data with a reader device, such as reader 302, via a credential interface of the reader device, such as antenna 506. One example of credential device 314 is an RFID smartcard (e.g., smartcard 314a) that has data stored thereon allowing a holder of the credential device to access a secure area or asset protected by reader 302, such as secure area 304. Other examples of credential devices 314 include, but are not limited to, proximity RFID-based cards, access control cards, credit cards, debit cards, passports, identification cards, key fobs, NFC-enabled devices, mobile phones (e.g., mobile device 314b), personal digital assistants (PDAs), tags, or any other device configurable to emulate a virtual credential. More generally, a credential device 314 may include some, any, or all of the various components described above with respect to the block diagram schematics of FIGS. 5 and 6. In some example embodiments, such as but not limited to certain LACS embodiments, reader 302 and credential device 314 may be the same device, wherein, for example, the user may be attempting to access a logical asset via the user's own mobile device (e.g., mobile device 314b). If reader 302, control panel 308, and/or host server 312 determine that the user's 301 credential or credential data provided by credential device 314 is valid and/or authorized, reader 302, control panel 308, or host server 312 may operate control mechanism 306 to allow access to the secure asset 304 by the user 301 having the credential device.

Any of the devices described herein, such as reader 302, control panel 308, host server 312, or credential 314, may operate as an endpoint device 102, 104 according to the present disclosure. More particularly, any of the devices described herein, such as reader 302, control panel 308, host server 312, or credential 314, may operate as an initiator device 202 or responder device 204 in any given communication stream, according to the present disclosure. However, the present disclosure is not limited to use solely in access control systems, and the examples of the present disclosure are applicable to any application for which secure communication or secure messaging between devices is desirable.

Although the flowchart of FIG. 2 illustrates an example method as comprising sequential steps or processes as having a particular order of operations, some or many of the steps or operations in the flowchart can be performed in parallel or concurrently, and the flowchart should be read in the context of the various example embodiments of the present disclosure. The order of the method steps or process operations illustrated in FIG. 2 may be rearranged for some embodiments. Similarly, the method illustrated in FIG. 2 could have additional steps or operations not included therein or fewer steps or operations than those shown.

Concatenation operations of two or more parameters in the form A||B, A||B||C, or the like, described herein, are intended to include, but are not limited to, concatenation of the described parameters (e.g., A, B, C) in the specific order identified. Any such concatenation operations of two or more parameters in the form A||B, A||B||C, or the like, described herein, may also refer to concatenation of the parameters (e.g., A, B, C) in any order. Accordingly, as examples for purposes of illustration, concatenation operations in the form A||B may refer to either of the concatenation operations A||B or B||A, and concatenation operations in the form A||B||C may refer to any of the concatenation operations A||B||C, A||C||B, B||A||C, B||C||A, C||A||B, or C||B||A.

Additional Examples

Example 1 includes subject matter (such as a method) for creating a secure channel between devices for secure communication therebetween. The subject matter comprises transmitting a first nonce from an initiator device to a responder device; receiving, at the initiator device, a second nonce and an identity of the responder device; transmitting an identity of the initiator device and a first set of one or more encrypted data objects from the initiator device to the responder device; receiving, at the initiator device, a second set of one or more encrypted data objects from the responder device; and generating, at the initiator device, a session key for secure communication between the initiator and responder devices.

In Example 2, the subject matter of Example 1 optionally includes wherein the identity of the responder device comprises at least one of a first public key of an asymmetric key pair stored by the responder device or a first public key certificate from a certification authority.

In Example 3, the subject matter of either Example 1 or Example 2 optionally includes wherein the identity of the initiator device comprises at least one of a second public key of an asymmetric key pair stored by the initiator device or a second public key certificate from a certification authority.

In Example 4, the subject matter of any of Examples 1 to 3 optionally includes wherein the first set of one or more encrypted data objects comprises a first encrypted data object and a second encrypted data object.

In Example 5, the subject matter of Example 4 optionally includes wherein the first encrypted data object comprises at least the second nonce encrypted using a block cipher mode of operation using a first encryption key.

In Example 6, the subject matter of either Example 4 or Example 5 optionally includes wherein the second encrypted data object comprises at least the first encrypted data object encrypted using a message authentication code algorithm using a second encryption key.

In Example 7, the subject matter of any of Examples 1 to 6 optionally includes wherein the second set of one or more encrypted data objects comprises a third encrypted data object and a fourth encrypted data object.

In Example 8, the subject matter of Example 7 optionally includes wherein the third encrypted data object comprises at least the first nonce encrypted using the block cipher mode of operation using the first encryption key.

In Example 9, the subject matter of either Example 7 or Example 8 optionally includes wherein the fourth encrypted data object comprises at least the third encrypted data object encrypted using the message authentication code algorithm using the second encryption key.

In Example 10, the subject matter of any of Examples 6 to 9 optionally includes wherein the session key comprises a set of symmetric encryption keys comprising the first encryption key and the second encryption key.

In Example 11, the subject matter of any of Examples 1 to 3 optionally includes wherein: the first set of one or more encrypted data objects comprises at least the second nonce encrypted using an authenticated encryption (AE) algorithm; and the second set of one or more encrypted data objects comprises at least the first nonce encrypted using the authenticated encryption (AE) algorithm.

In Example 12, the subject matter of any of Examples 1 to 11 optionally includes wherein the initiator device is one of a reader of an access control system or a credential device, and the responder device is another of the reader and the credential device.

Example 13 includes subject matter (such as a method) for creating a secure channel between devices for secure communication therebetween. The subject matter comprises receiving a first nonce from an initiator device at a responder device; transmitting a second nonce and an identity of the responder device from the responder device to the initiator device; receiving an identity of the initiator device and a first set of one or more encrypted data objects from the initiator device at the responder device; transmitting a second set of one or more encrypted data objects from the responder device to the initiator device; and generating, at the responder device, a session key for secure communication between the initiator and responder devices.

In Example 14, the subject matter of Example 13 optionally includes wherein the identity of the responder device comprises at least one of a first public key of an asymmetric key pair stored by the responder device or a first public key certificate from a certification authority; and/or the identity of the initiator device comprises at least one of a second public key of an asymmetric key pair stored by the initiator device or a second public key certificate from a certification authority.

In Example 15, the subject matter of either Example 13 or Example 14 optionally includes wherein: the first set of one or more encrypted data objects comprises a first encrypted data object comprising at least the second nonce encrypted using a block cipher mode of operation using a first encryption key; and a second encrypted data object comprising at least the first encrypted data object encrypted using a message authentication code algorithm using a second encryption key; and/or the second set of one or more encrypted data objects comprises a third encrypted data object comprising at least the first nonce encrypted using the block cipher mode of operation using the first encryption key; and a fourth encrypted data object comprising at least the third encrypted data object encrypted using the message authentication code algorithm using the second encryption key.

In Example 16, the subject matter of Example 15 optionally includes wherein the session key comprises a set of symmetric encryption keys comprising the first encryption key and the second encryption key.

In Example 17, the subject matter of either Example 13 or Example 14 optionally includes wherein: the first set of one or more encrypted data objects comprises at least the second nonce encrypted using an authenticated encryption (AE) algorithm; and/or the second set of one or more encrypted data objects comprises at least the first nonce encrypted using the authenticated encryption (AE) algorithm.

Example 18 includes subject matter relating to a non-transitory computer readable medium comprising executable program code, that when executed by one or more processors, causes the one or more processors to: transmit a first nonce from an initiator device to a responder device; transmit a second nonce and an identity of the responder device from the responder device to the initiator device; transmit an identity of the initiator device and a first set of one or more encrypted data objects from the initiator device to the responder device; transmit a second set of one or more encrypted data objects from the responder device to the initiator device; and generate, at each of the initiator device and responder device, a session key for secure communication between the initiator and responder devices.

In Example 19, the subject matter of Example 18 optionally includes wherein: the first set of one or more encrypted data objects comprises a first encrypted data object comprising at least the second nonce encrypted using a block cipher mode of operation using a first encryption key; and a second encrypted data object comprising at least the first encrypted data object encrypted using a message authentication code algorithm using a second encryption key; and/or the second set of one or more encrypted data objects comprises a third encrypted data object comprising at least the first nonce encrypted using the block cipher mode of operation using the first encryption key; and a fourth encrypted data object comprising at least the third encrypted data object encrypted using the message authentication code algorithm using the second encryption key.

In Example 20, the subject matter of Example 18 optionally includes wherein the first set of one or more encrypted data objects comprises at least the second nonce encrypted using an authenticated encryption (AE) algorithm; and/or the second set of one or more encrypted data objects comprises at least the first nonce encrypted using the authenticated encryption (AE) algorithm.

In Example 21, the subject matter of any of Examples 18 to 20 optionally includes wherein the initiator device is one of a reader of an access control system or a credential device, and the responder device is another of the reader and the credential device.

Additional Notes

The above detailed description includes references to the accompanying drawings, which form a part of the detailed description. The drawings show, by way of illustration, specific embodiments that can be practiced. These embodiments may also be referred to herein as "examples." Such embodiments or examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein. That is, the above-described embodiments or examples or one or more aspects, features, or elements thereof can be used in combination with each other.

As will be appreciated by one of skill in the art, the various embodiments of the present disclosure may be embodied as a method (including, for example, a computer-implemented process, a business process, and/or any other process), apparatus (including, for example, a system, machine, device, computer program product, and/or the like), or a combination of the foregoing. Accordingly, embodiments of the present disclosure or portions thereof may take the form of an entirely hardware embodiment, an entirely software embodiment (including firmware, middleware, microcode, hardware description languages, etc.), or an embodiment combining software and hardware aspects. Furthermore, embodiments of the present disclosure may take the form of a computer program product on a computer-readable medium or computer-readable storage medium, having computer-executable program code embodied in the medium, that define processes or methods described herein. A processor or processors may perform the necessary tasks defined by the computer-executable program code. In the context of this disclosure, a computer readable medium may be any medium that can contain, store, communicate, or transport the program for use by or in connection with the systems disclosed herein. As indicated above, the computer readable medium may be, for example but is not limited to, an electronic, magnetic, optical, electromagnetic, infrared, or semiconductor system, apparatus, or device. More specific examples of suitable computer readable medium include, but are not limited to, an electrical connection having one or more wires or a tangible storage medium such as a portable computer diskette, a hard disk, a random access memory (RAM), a read-only memory (ROM), an erasable programmable read-only memory (EPROM or EEPROM), a compact disc read-only memory (CD-ROM), or other optical, magnetic, or solid state storage device. As noted above, computer-readable media includes, but is not to be confused with, computer-readable storage medium, which is intended to cover all physical, non-transitory, or similar embodiments of computer-readable media.

In the foregoing description various embodiments of the present disclosure have been presented for the purpose of illustration and description. They are not intended to be exhaustive or to limit the invention to the precise form disclosed. Obvious modifications or variations are possible in light of the above teachings. The various embodiments were chosen and described to provide the best illustration of the principals of the disclosure and their practical application, and to enable one of ordinary skill in the art to utilize the various embodiments with various modifications as are suited to the particular use contemplated. All such modifications and variations are within the scope of the present disclosure as determined by the appended claims when interpreted in accordance with the breadth they are fairly, legally, and equitably entitled.

What is claimed is:

1. A method for creating a secure channel between devices for secure communication therebetween, the method comprising:
    transmitting a first nonce from an initiator device to a responder device;
    receiving, at the initiator device, a second nonce and an identity of the responder device;
    transmitting an identity of the initiator device and a first set of one or more encrypted data objects from the initiator device to the responder device;
    receiving, at the initiator device, a second set of one or more encrypted data objects from the responder device; and
    generating, at the initiator device, a session key for secure communication between the initiator and responder devices;
    wherein the first set of one or more encrypted data objects comprises at least the second nonce encrypted using the session key.

2. The method of claim 1, wherein the identity of the responder device comprises at least one of a first public key of an asymmetric key pair stored by the responder device or a first public key certificate from a certification authority.

3. The method of claim 2, wherein the identity of the initiator device comprises at least one of a second public key of an asymmetric key pair stored by the initiator device or a second public key certificate from a certification authority.

4. The method of claim 3, wherein the first set of one or more encrypted data objects comprises a first encrypted data object and a second encrypted data object.

5. The method of claim 4, wherein the session key comprises a set of symmetric encryption keys comprising a first encryption key and a second encryption key.

6. The method of claim 5, wherein the first encrypted data object comprises at least the second nonce encrypted using a block cipher mode of operation using the first encryption key.

7. The method of claim 5, wherein the second encrypted data object comprises at least the first encrypted data object encrypted using a message authentication code algorithm using the second encryption key.

8. The method of claim 6, wherein the second set of one or more encrypted data objects comprises a third encrypted data object and a fourth encrypted data object.

9. The method of claim 7, wherein the third encrypted data object comprises at least the first nonce encrypted using the block cipher mode of operation using the first encryption key.

10. The method of claim 8, wherein the fourth encrypted data object comprises at least the third encrypted data object encrypted using the message authentication code algorithm using the second encryption key.

11. The method of claim 3, wherein:
    the first set of one or more encrypted data objects comprises at least the second nonce encrypted using an authenticated encryption (AE) algorithm; and
    the second set of one or more encrypted data objects comprises at least the first nonce encrypted using the authenticated encryption (AE) algorithm.

12. The method of claim 1, wherein the initiator device is one of a reader of an access control system or a credential device, and the responder device is another of the reader and the credential device.

13. A method for creating a secure channel between devices for secure communication therebetween, the method comprising:
    receiving a first nonce from an initiator device at a responder device;
    transmitting a second nonce and an identity of the responder device from the responder device to the initiator device;
    receiving an identity of the initiator device and a first set of one or more encrypted data objects from the initiator device at the responder device;
    transmitting a second set of one or more encrypted data objects from the responder device to the initiator device; and
    generating, at the responder device, a session key for secure communication between the initiator and responder devices;
    wherein the second set of one or more encrypted data objects comprises at least the first nonce encrypted using the session key.

14. The method of claim 13, wherein:
    the identity of the responder device comprises at least one of a first public key of an asymmetric key pair stored by the responder device or a first public key certificate from a certification authority; and
    the identity of the initiator device comprises at least one of a second public key of an asymmetric key pair stored by the initiator device or a second public key certificate from a certification authority.

15. The method of claim 14, wherein:
    wherein the session key comprises a set of symmetric encryption keys comprising a first encryption key and a second encryption key; and
    the first set of one or more encrypted data objects comprises:
        a first encrypted data object comprising at least the second nonce encrypted using a block cipher mode of operation using the first encryption key; and
        a second encrypted data object comprising at least the first encrypted data object encrypted using a message authentication code algorithm using the second encryption key; and
    the second set of one or more encrypted data objects comprises:
        a third encrypted data object comprising at least the first nonce encrypted using the block cipher mode of operation using the first encryption key; and a fourth encrypted data object comprising at least the third encrypted data object encrypted using the message authentication code algorithm using the second encryption key.

16. The method of claim 14, wherein:
the first set of one or more encrypted data objects comprises at least the second nonce encrypted using an authenticated encryption (AE) algorithm; and
the second set of one or more encrypted data objects comprises at least the first nonce encrypted using the authenticated encryption (AE) algorithm.

17. A non-transitory computer readable medium comprising executable program code, that when executed by one or more processors, causes the one or more processors to:
transmit a first nonce from an initiator device to a responder device;
transmit a second nonce and an identity of the responder device from the responder device to the initiator device;
transmit an identity of the initiator device and a first set of one or more encrypted data objects from the initiator device to the responder device;
transmit a second set of one or more encrypted data objects from the responder device to the initiator device; and
generate, at each of the initiator device and responder device, a session key for secure communication between the initiator and responder devices;
wherein the first set of one or more encrypted data objects comprises at least the second nonce encrypted using the session key.

18. The non-transitory computer readable medium of claim 17, wherein:
wherein the session key comprises a set of symmetric encryption keys comprising a first encryption key and a second encryption key; and
the first set of one or more encrypted data objects comprises:
a first encrypted data object comprising at least the second nonce encrypted using a block cipher mode of operation using the first encryption key; and
a second encrypted data object comprising at least the first encrypted data object encrypted using a message authentication code algorithm using the second encryption key; and
the second set of one or more encrypted data objects comprises:
a third encrypted data object comprising at least the first nonce encrypted using the block cipher mode of operation using the first encryption key; and
a fourth encrypted data object comprising at least the third encrypted data object encrypted using the message authentication code algorithm using the second encryption key.

19. The non-transitory computer readable medium of claim 17, wherein:
the first set of one or more encrypted data objects comprises at least the second nonce encrypted using an authenticated encryption (AE) algorithm; and
the second set of one or more encrypted data objects comprises at least the first nonce encrypted using the authenticated encryption (AE) algorithm.

20. The non-transitory computer readable medium of claim 17, wherein the initiator device is one of a reader of an access control system or a credential device, and the responder device is another of the reader and the credential device.

* * * * *